(12) United States Patent
Eckert et al.

(10) Patent No.: US 6,742,850 B1
(45) Date of Patent: Jun. 1, 2004

(54) METHOD FOR ADJUSTING A BRAKE SYSTEM OF A VEHICLE

(75) Inventors: Alfred Eckert, Mainz-Hechtsheim (DE); Ulrich Neumann, Rossdorf (DE); Thomas Berthold, Darmstadt (DE); Andreas Klein, Bad Homburg (DE); Jürgen Pfeiffer, Glashütten (DE); Christian Albrich von Albrichsfeld, Darmstadt (DE)

(73) Assignee: Continental Teves AG & Co., oHG, Frankfurt (DE)

( * ) Notice: Subject to any disclaimer, the term of this patent is extended or adjusted under 35 U.S.C. 154(b) by 0 days.

(21) Appl. No.: 10/069,349

(22) PCT Filed: Aug. 11, 2000

(86) PCT No.: PCT/EP00/07863

§ 371 (c)(1),
(2), (4) Date: Feb. 22, 2002

(87) PCT Pub. No.: WO01/14194

PCT Pub. Date: Mar. 1, 2001

(30) Foreign Application Priority Data

Aug. 24, 1999  (DE) .......................................... 199 39 874
Mar. 27, 2000  (DE) .......................................... 100 15 224

(51) Int. Cl.⁷ ................................................. B60T 8/60
(52) U.S. Cl. .......................... 303/144; 180/170; 701/93
(58) Field of Search ............................... 303/167, 144; 180/170, 175; 701/93, 70; 188/DIG. 1

(56) References Cited

U.S. PATENT DOCUMENTS 5,713,428 A * 2/1998 Linden et al. ............... 180/179
5,924,508 A * 7/1999 Clauss et al. ............... 180/179
6,135,578 A * 10/2000 Clar et al. ................ 303/114.3
6,259,985 B1 * 7/2001 Sielagoski et al. ............ 701/96
6,330,506 B1 * 12/2001 Roulet ........................ 701/93

FOREIGN PATENT DOCUMENTS

| DE | 44 06 128 | 2/1995 |
| DE | 19712857 | 10/1998 |
| DE | 197 12 858 | 10/1998 |
| DE | 198 17 326 | 10/1999 |
| EP | 0 867 325 | 9/1998 |
| EP | 0 867 349 | 9/1998 |
| GB | EP 1083075 A1 * | 3/2001 |

OTHER PUBLICATIONS

Search Report of the German Patent Office for Appln 10015224.4.

* cited by examiner

Primary Examiner—Jack Lavinder
Assistant Examiner—Mariano Sy
(74) Attorney, Agent, or Firm—Rader, Fishman & Grauer PLLC

(57) ABSTRACT

A method for controlling a brake system for automotive vehicles including a vehicle speed control unit permitting the adjustment of a predetermined vehicle speed by way of an automatic intervention into brake control, wherein upon a braking request of the vehicle speed control unit and, simultaneously, a braking request of the driver the function of the vehicle speed control unit is deactivated, wherein the pressure ($P_x$) introduced into the wheel brake due to the braking request of the vehicle speed control unit is reduced according to a predetermined function upon the braking request of the driver, wherein preferably a resulting brake pressure ($P_{res}$) is adjusted in the wheel brake of the vehicle which is determined by the formula $$P_{res}=P_F+P_{x[1]}-(P_F*P_{x[1]})/\text{constant } Z.$$

14 Claims, 4 Drawing Sheets

METHOD FOR ADJUSTING A BRAKE SYSTEM OF A VEHICLE

TECHNICAL FIELD

The present invention generally relates to vehicle brake systems, and more particularly relates to a method for controlling a brake system for automotive vehicles including a vehicle speed control unit permitting the adjustment of a predetermined vehicle speed by way of an automatic intervention into brake control.

BACKGROUND OF THE INVENTION

Brake control systems including a vehicle speed control unit which adjusts a predetermined vehicle speed by way of an automatic brake intervention are known in the art. Depression of the brake pedal by the driver causes the vehicle speed control unit to change from the activated into the deactivated mode, with the result that an automatic brake intervention operation performed by the vehicle speed control unit is terminated. The pressure which recently prevailed in the wheel brakes due to the automatic brake intervention is reduced until the brake pressure introduced into the wheel brakes rises again due to application of the brake pedal. This causes a jerk (discontinuity) in the vehicle deceleration.

EP 0 867 349 discloses a method intended to prevent this break in the vehicle deceleration. It is proposed therein that after the deactivation of the vehicle speed control unit at the beginning of the application of the brake pedal, the actual pressure which was adjusted the last by the vehicle speed control unit is maintained or continuously adapted to a higher nominal pressure demanded by the driver, or a total pressure is adjusted which corresponds to the sum of the actual pressure and the nominal pressure. The brake pressure predetermined by the vehicle speed control unit is not reduced when the brake pedal is applied, but rather maintained or increased, with the aim of providing jerkfree transitions from an activated mode into a deactivated mode of the vehicle speed control unit.

In a brake system with an active, electrically actuated brake force booster, the brake pedal is moved along with an automatic brake intervention of the vehicle speed control unit. When the driver wishes to brake more vigorously or deactivate the vehicle speed control unit, he/she will apply the brake pedal at that point and with the force that corresponds to the brake pressure in the wheel brake. In a so-called 'brake-by-wire brake system' where the transmission of the driver's braking request from the brake pedal to the hydraulic actuators, when an electrohydraulic brake (EHB) is concerned, or to the electromechanic actuators, when an electromechanic brake (EMB) is concerned, is effected electrically, the brake pedal remains in the inactive position. The take-over by the driver during a braking operation initiated by the vehicle speed control unit is not transparent for the driver, especially in a brake-by-wire brake system.

BRIEF SUMMARY OF THE INVENTION

An object of the present invention is to improve the method according to the state of the art and, especially for a brake-by-wire brake system, to render the take-over of the control of the braking operation from an automatic brake intervention of the vehicle speed control unit to a brake actuation determined by the driver comfortable and also transparent.

SUMMARY OF THE INVENTION

The essence of the present invention resides in that after the function of the vehicle speed control unit is deactivated in the event of a braking request of the vehicle speed control unit and, simultaneously, a braking request of the driver, the pressure ($P_A$) introduced into the wheel brake due to the braking request of the vehicle speed control unit is reduced according to a predetermined function ($P_X$) upon the braking request of the driver.

The reduction of the pressure ($P_A$) introduced into the wheel brake in response to the braking request of the vehicle speed control unit permits the driver to recognize when the application of the brake pedal leads to a brake intervention controlled by the driver. The reduction is performed according to a predetermined function which is so chosen that the brake application is comfortable and also transparent for the driver and, in addition, a maximum high deceleration is ensured in an emergency situation (panic stop).

According to the present invention, an at least approximately linear ramp function is predetermined as the function.

The predetermined function has a mean (negative) gradient ($m_{PX}$) of (20 bar/5 sec) to (30 bar/0.5 sec), preferably of (20 bar/2 sec) to (30 bar/1 sec) as disclosed by the present invention.

In the present invention, the function is changed in accordance with the braking request of the driver.

According to the present invention, a function is predetermined upon a request of the driver for quick braking of the vehicle causing quick reduction of the pressure ($P_A$) introduced into the wheel brake due to the braking request of the vehicle speed control unit, and upon a request of the driver for slow braking of the vehicle a function is predetermined causing slow reduction of the pressure ($P_A$) introduced into the wheel brake due to the braking request of the vehicle speed control unit.

It is arranged for by the present invention that a mean (positive) gradient ($m_{PF}$) of the brake pressure is determined from the braking request of the driver, and therefrom the mean (negative) gradient ($m_{PX}$) of the predetermined function is defined by the formula $m_{PX} = -m_{PF} *$ constant K, until a top limit value of 100 bar/sec). This means a maximum mean (negative) gradient ($m_{PX}$) and, thus, a maximum pressure reduction speed of (100 bar/sec) is predetermined. The constant K has preferably a value in the range from 1 to 2, particularly preferred is a value of 1.5.

Because it is desired that brake pressure reduction is carried out in each case relatively quickly after deactivation of the vehicle speed control unit, it is arranged for that the value for the mean (negative) gradient ($m_{PX}$) of the predetermined function does not fall below a minimum limit value (lowest pressure reduction speed) in a range of (20 bar/5 sec) until (20 bar/2 sec), preferably 20 bar/3 sec).

It is provided according to the present invention that a resulting brake pressure ($P_{res}$) in the wheel brake of the vehicle is adjusted in accordance with the pressure ($P_F$) introduced into the wheel brake due to the braking request of the driver, and the pressure ($P_X$) introduced into the wheel brake due to the predetermined function.

According to an embodiment of the present invention, a resulting brake pressure ($P_{res}$) is adjusted in the wheel brake of the vehicle which corresponds to the sum of a pressure ($P_F$) introduced into the wheel brake due to the braking request of the driver and the pressure ($P_X$) introduced by the predetermined function into the wheel brake.

According to another embodiment of the present invention, a resulting brake pressure ($P_{res}$) is adjusted in the wheel brake of the vehicle which corresponds to the higher of the two pressures, i.e., the pressure ($P_F$) introduced into the wheel brake due to the braking request of the driver or the pressure ($P_X$) introduced by the predetermined function into the wheel brake.

In another embodiment of the present invention, a resulting brake pressure ($P_{res}$) is adjusted in the wheel brake of the vehicle which corresponds to a value that is lower than the sum of the pressure ($P_F$) introduced into the wheel brake due to the braking request of the driver and the pressure ($P_X$) introduced by the predetermined function into the wheel brake, and which is higher than the higher one of the two pressures, i.e., the pressure ($P_F$) introduced into the wheel brake due to the braking request of the driver or the pressure ($P_X$) introduced by the predetermined function into the wheel brake.

The latter embodiment of the present invention is especially preferred because it renders the brake pressure take-over by the driver especially comfortable and also transparent. According to the present invention, it has proved particularly favorable to adjust a resulting brake pressure ($P_{res}$) in the wheel brake of the vehicle which corresponds to a value that is determined by the formula $P_{res}=P_F+P_X-(P_F*P_X)/\text{constant } Z$.

According to the present invention, the constant Z (adjustment factor) has a value in the range of 20 bar to 100 bar, preferably 30 bar to 70 bar.

It is in the sense of the present invention that the brake pressure in the wheel brake is generated by independent energy, in particular, by a hydraulic accumulator and a motor-and-pump assembly. Preferably, the brake pressure request of the driver is sensed by means of a pedal travel simulator and associated sensors and transmitted electronically to a brake control unit (brake-by-wire brake system).

Further, the object is achieved by a device for controlling a brake system for automotive vehicles with a vehicle speed control unit which includes means to adjust a predetermined vehicle speed by means of an automatic intervention into the brake control and means to deactivate the function of the vehicle speed control unit in the event of a braking request of the vehicle speed control unit and, simultaneously, a braking request of the driver, the said device being characterized by the provision of means to reduce the pressure ($P_X$) introduced into the wheel brake due to the braking request of the vehicle speed control according to a predetermined function unit in the event of the braking request of the driver, and by the provision of means to adjust in particular a resulting brake pressure ($P_{res}$) in the wheel brake of the vehicle that is determined by the formula $P_{res}=P_F+P_X-(P_F*P_X)/\text{constant } Z$.

Preferably, an independent-force-actuated, preferably electronically controllable vehicle brake, especially brake-by-wire vehicle brake, includes the device of the present invention for controlling the vehicle brake system.

DETAILED DESCRIPTION OF THE PREFERRED EMBODIMENTS

Figure 1:
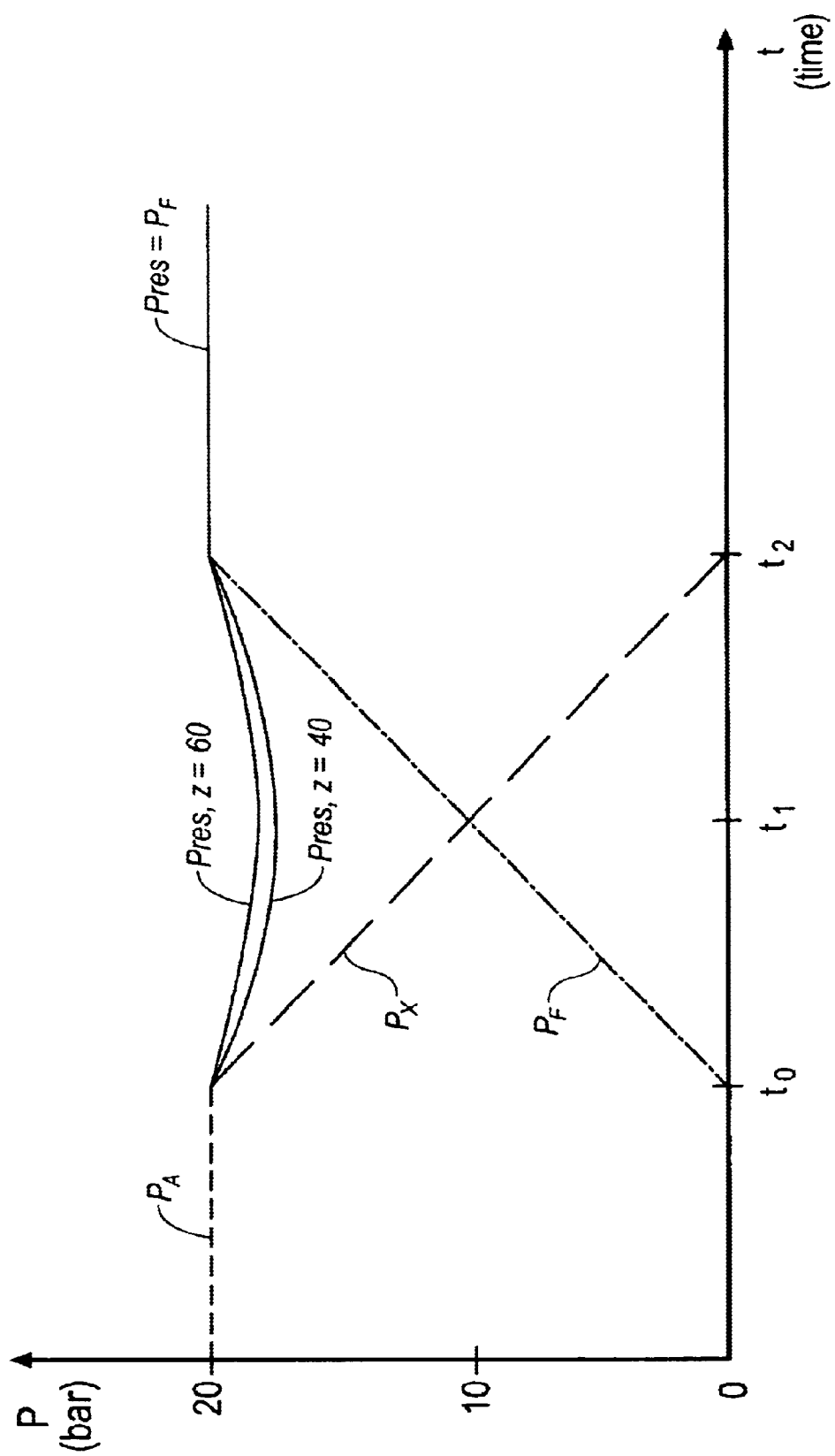
FIG. 1 is a view of the time dependence of the pressure ($P_A$) that is introduced into the wheel brake by the vehicle speed control unit, of the pressure ($P_X$) introduced by the predetermined function into the wheel brake, of the pressure ($P_F$) introduced into the wheel brake due to the braking request of the driver, and of the resulting brake pressure ($P_{res}$) calculated according to the formula $P_{res}=P_F+P_X-(P_F*P_X)/\text{constant } Z$ for a predetermined pressure $P_X$ of 20 bar and a final pressure $P_F$ of likewise 20 bar.

The embodiment of FIG. 1 illustrates the pressure variation of the pressure ($P_A$) (line with short dashes) introduced into the wheel brake by the vehicle speed control unit, of the pressure ($P_X$) introduced into the wheel brake by the predetermined function (line with long dashes), of the pressure ($P_F$) introduced into the wheel brake due to the braking request of the driver (dot-dash line), and of the resulting brake pressure ($P_{res}$) (solid lines) plotted against the time (t). The pressure $P_{res}$ adjusted in the wheel brake of the vehicle was determined according to the formula $P_{res}=P_F+P_X-(P_F*P_X)/\text{constant } Z$. As a constant Z, a value of Z=60 (see above, solid line $P_{res,Z=60}$) and of Z=40 (see bottom solid line $P_{res,Z=40}$) is predetermined.

Until time $t_0$, the brake pressure P corresponds to the pressure ($P_A$) (line with short dashes) introduced into the wheel brake by the vehicle speed control unit, because there is no braking request of the driver.

A braking request of the driver is recognized at time $t_0$. The vehicle speed control unit is deactivated, and the current braking request of the vehicle speed control unit ($P_A$) is stored or temporarily stored. The braking request may be detected e.g. in a brake system controlled by independent energy by a contact with the brake pedal or when the brake pedal is depressed over a predetermined distance or with a predetermined force.

Starting from time $t_0$, based on the stored value of the braking request of the vehicle speed control unit, this brake pressure ($P_A$) is reduced until the value zero (line $P_X$) according to an at least approximately linear ramp function. The current value of $P_X$ and current value of the braking request by the driver ($P_F$) is used as a control quantity for adjusting the resulting brake pressure. The resulting brake pressure ($P_{res}$) is adjusted according to the formula $P_{res}=P_F+P_X-(P_F*P_X)/\text{constant } Z$. The brake pressure $P_{res}$ calculated according to this formula is illustrated in FIG. 1 for a value of Z=60 (top solid line $P_{res,Z=60}$) and Z=40 (bottom solid line $P_{res,Z=40}$).

As can be seen in FIG. 1, due to the inventive function for controlling the resulting brake pressure ($P_{res}$) and for the given limiting conditions, after time to the brake pressure $P_{res}$ is initially reduced relatively slowly until a defined value, is subsequently reincreased relatively slowly at time $t_1$ when $P_F+P_X$ roughly adopt the same value, and finally is brought into conformity with the value $P_F$ at time $t_2$. Due to the control of the present invention, the driver feels the deactivation of the vehicle speed control unit due to the decrease of the brake pressure commencing $t_0$, on the one hand. On the other hand, the driver feels the subsequent rise of the brake pressure commencing $t_1$ which indicates the take-over of the brake intervention corresponding to the driver's brake pedal depression. Commencing time $t_2$, the brake pressure is determined exclusively by the driver because $P_X$ adopted the value zero and, according to the above equation, the control is effected only according to the driver's request. Here, the pedal feeling to which the driver is accustomed is reached again, where a defined pedal position or a defined pedal resetting force causes a defined brake pressure or a defined vehicle deceleration—under the given limiting conditions, such as e.g. wheel slip conditions.

Figure 2:
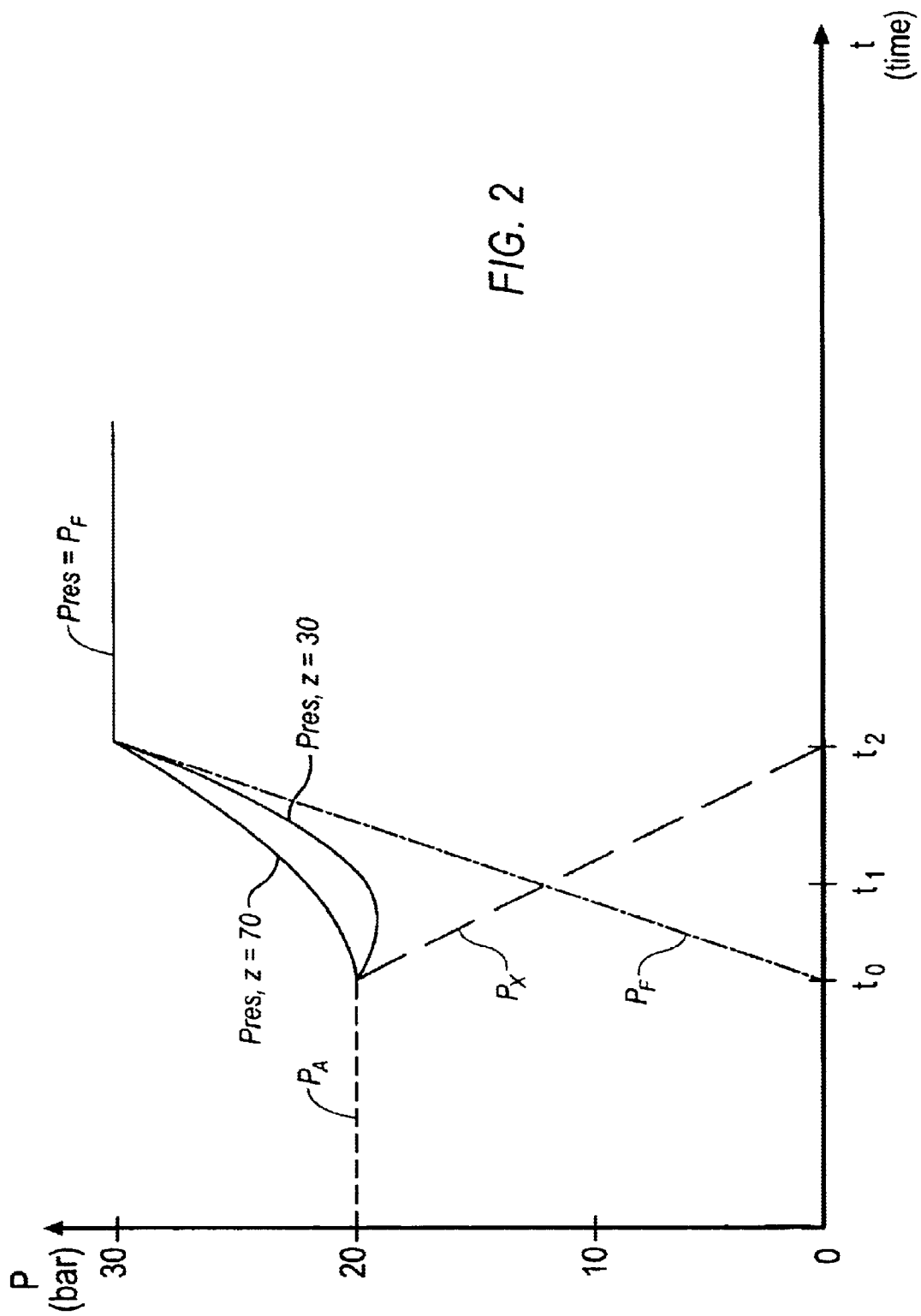
FIG. 2, similar to FIG. 1, shows the time dependence of $P_A$, $P_X$, $P_F$, and $P_{res}$, wherein $P_{res}$ was calculated according to the same formula, the output pressure $P_A$ also amounts to 20 bar, but the final pressure $P_F$ amounts to 30 bar.

In the variation of $P_A$, $P_X$, $P_F$, and $P_{res}$ illustrated in FIG. 2, a situation is assumed where the driver wishes a quick deceleration of the vehicle. In accordance with the relatively steep rise of the brake pressure ($P_F$) predefined by the driver, the linear ramp function also declines with a relatively great (negative) gradient, that means relatively quickly. The result is that the resulting brake pressure $P_{res}$ approaches the driver's specification $P_F$ relatively quickly, and the brake pressure take-over can be felt by the driver at time $t_1$ at the latest. This is illustrated in FIG. 2 for a value of Z=70 (top solid line $P_{res,Z=70}$) and of Z=30 (bottom solid line $P_{res,Z=30}$).

Following is an adaption of the ramp function for $P_X$ to the driver's specification which is characterized especially by the speed at which the driver depresses the brake pedal, to the end that the ramp for $P_X$ will decline more quickly in the event of a quicker depression, with the result that the driver more quickly determines directly the resulting brake pressure $P_{res}$. This is also shown in a comparison of the variations of the pressure curves $P_X$, $P_F$, and $P_{res}$ in FIG. 1 (slower pedal depression by the driver) and in FIG. 2 (quicker pedal depression by the driver).

Figure 3:
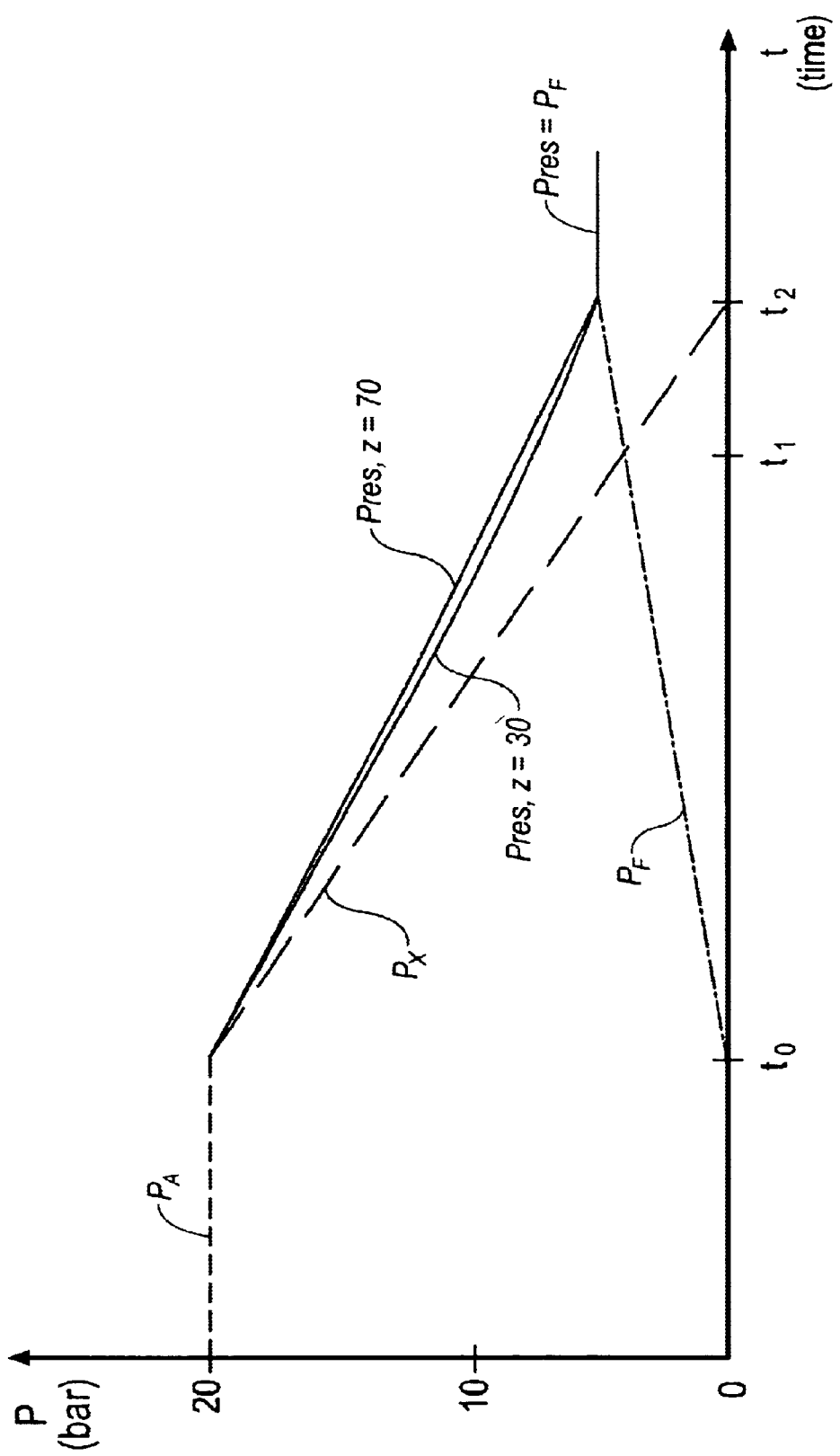
FIG. 3 shows the time dependence of $P_A$, $P_X$, $P_F$, and $P_{res}$ similar to FIGS. 1 and 2, wherein $P_{res}$ was calculated according to the same formula and the output pressure $P_A$ also amounts to 20 bar, but a lower final pressure $P_F$ of 5 bar prevails.

FIG. 3 shows the variation of $P_A$, $P_X$, $P_F$, and $P_{res}$ for a situation which is contrary to the situation shown in FIG. 2. This is because here the driver's speed of pedal depression is relatively low, and the brake pressure maximally desired by the driver is relatively low. Corresponding to the driver's request, commencing $t_0$, the speed control unit is initially deactivated. Then $P_X$ decreases according to a predetermined ramp function. The resulting brake pressure $P_{res}$ which is determined according to the mentioned formula and shall be adjusted will decline relatively quickly in this case so that finally, at time $t_2$, where $P_X$ adopts the value zero, the resulting brake pressure $P_{res}$ is exclusively defined by the brake pressure $P_F$ determined by the driver. This is illustrated in FIG. 3 for a value of Z=70 (top solid line $P_{res,Z=70}$) and of Z=30 (bottom solid line $P_{res,Z=30}$). In this case, too, initially the deactivation of the speed control unit at time $t_0$ can be felt by the driver due to the reduction of the pressure on the wheel brakes (lines $P_{res}$). Also, the transition to the brake pressure delivery which is exclusively determined by the driver becomes transparent to the driver commencing time $t_2$ because the pedal feeling he/she is used to will begin at this point of time.

It becomes apparent from the previously mentioned examples that, on the one hand, the deactivation of the speed control unit and the brake pressure buildup corresponding to brake pedal depression is transparent to the driver by means of the present invention and that, on the other hand, a comfortable adaption of the brake pressure ($P_A$) which is initially predetermined by the speed control unit to the brake pressure level ($P_F$) desired by the driver is achieved.

Figure 4:
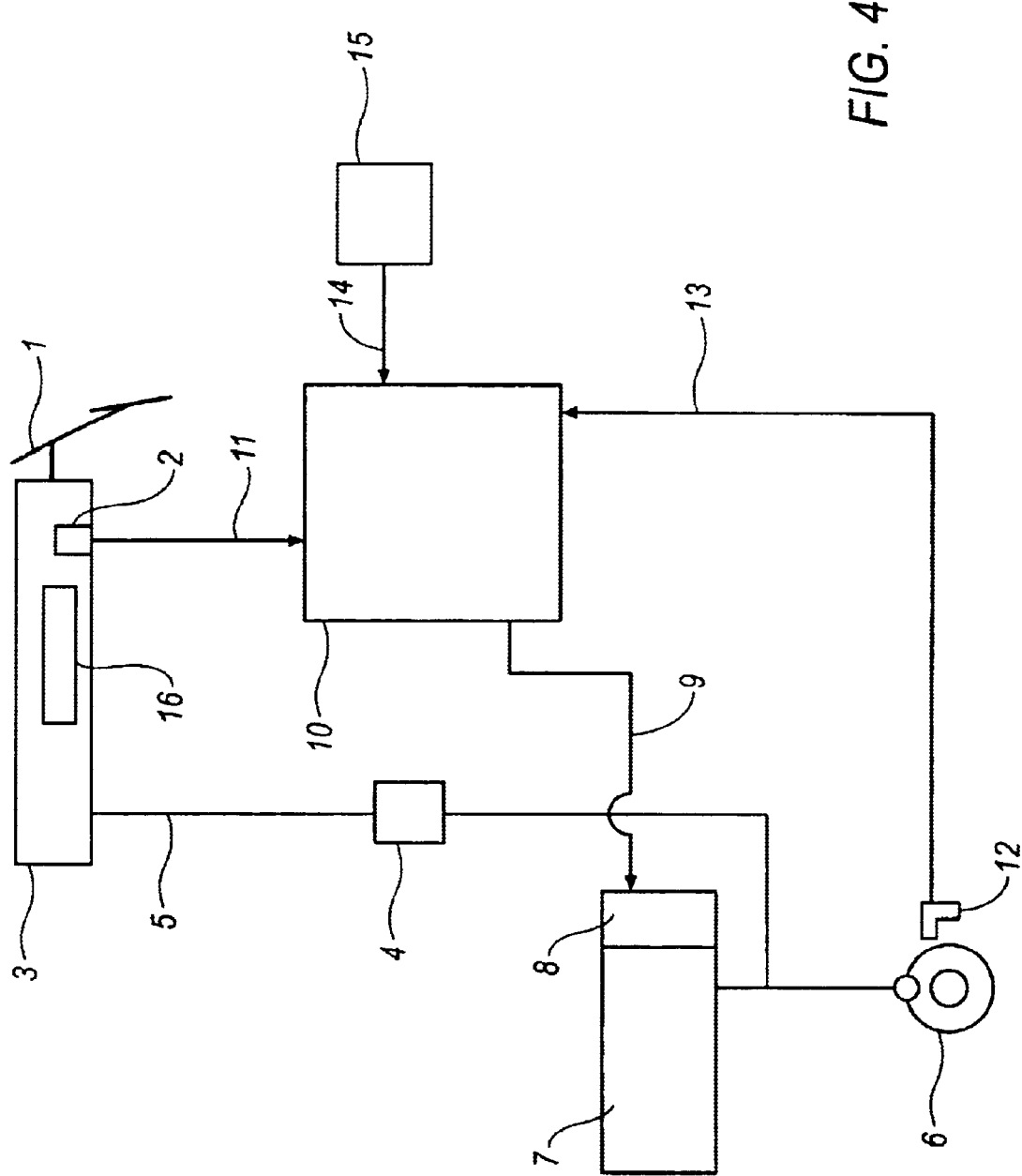
FIG. 4 schematically shows possible components of the device of the present invention.

Possible components of the device of the present invention for a brake-by-wire brake system are represented in FIG. 4. A brake pedal 1 with at least one travel sensor 2 for sensing the pedal position is connected to a master brake cylinder 3. Master brake cylinder 3 is connected to wheel brake 6 of the vehicle by way of a hydraulic line 5 that can be closed by means of a valve 4. The normally open valve 4 is closed in a normal service brake function, and the required brake pressure is generated and controlled by means of an independent energy source 8 with a hydraulic control circuit 7, in particular, a motor-pump-accumulator unit 8 and electromagnetic valves 7. The motor-pump-accumulator unit 8 and the electromagnetic valves 7 are controlled by corresponding signals of a control unit 10 by way of line 9. A signal for the braking pressure request of the driver, sensed by means of the at least one sensor 2, is sent to the control unit 10 by way of line 11. By way of line 14, control unit 10 is connected to a speed control unit 15 by which, in the activated mode, a predetermined vehicle speed is adjustable by means of an automatic brake intervention by way of actuation of the controllable brake system components 7, 8. Further, a pedal travel simulator 16 is assigned to the brake pedal 1 to produce a pedal feeling which is 'familiar' to the driver. Further, the signal for the wheel rotational behavior sensed by a wheel speed sensor 12 is sent to the control unit 10 by way of line 13. E.g. the current own speed of the vehicle and said's acceleration or deceleration can be sensed by means of wheel speed sensor 12. According to the signals sent to the control unit 10, corresponding to the method of the present invention, the current deceleration of the vehicle is sensed, evaluated as a control quantity, and the vehicle is slowed down corresponding to a predetermined function in accordance with the control quantity. In doing so, preferably a resulting brake pressure ($P_{res}$) is adjusted in the wheel brake 6 of the vehicle which is determined by the formula $P_{res}=P_F+P_X-(P_F*P_X)/$constant Z. Only in a case of emergency will brake pressure be applied to the wheel brake 6 by way of the master brake cylinder 3, the normally open valve 4, and line 5. This so-called hydraulic punch-through ensures an auxiliary braking function in this electronically controlled brake-by-wire brake system. In addition, reference is made to DE 197 18 533 A1 for a possible detailed arrangement of the hydraulic components of the brake-by-wire brake system and for said mode of operation.

What is claimed is:

1. Device for controlling a brake system for vehicles, comprising:
    a vehicle speed control unit which includes means to adjust a predetermined vehicle speed by means of an automatic intervention into a brake controller and
    means for deactivating the function of the vehicle speed control unit in the event of a simultaneous braking request from the vehicle speed control unit and a braking request of the driver, wherein the device includes means to reduce the pressure $P_A$ introduced into the wheel brake due to the braking request of the vehicle speed control unit according to a predetermined function $P_X$ in the event of the braking request of the driver, and
    means for adjusting a resulting brake pressure $P_{res}$ in the wheel brake of the vehicle that is determined by the formula $$P_{res}=P_F+P_X-(P_F*P_X)/\text{constant } Z,$$

where: $P_F$ is the pressure introduced into the wheel brake due to the brake request of the drive;
    $P_X$ is the pressure introduced into the wheel brake by the vehicle speed control according to a predetermined function.

2. Method for controlling a vehicle brake system, comprising the steps of:
    permitting a vehicle speed control unit to adjust a predetermined vehicle speed by way of an automatic intervention into a brake control,
    deactivating the vehicle speed control unit, upon a braking request of a vehicle driver, the deactivation of the vehicle speed control unit is accomplished by reducing a pressure $P_A$ of the brake fluid pressure introduced into a wheel brake due to a braking request of the vehicle speed control unit according to a predetermined function $P_X$ upon the braking request of the driver, wherein an approximately linear ramp function is used as the predetermined function.

3. Method as claimed in claim 2, wherein the predetermined function has a mean negative gradient $m_{PX}$ of 20 bar/5 sec to 30 bar/0.5 sec.

4. Method as claimed in claim 2, wherein the function is variable, as a function of the braking request of the driver.

5. Method as claimed in claim 2, the method further includes the step of:

changing the predetermined function in accordance with the braking request of the driver, wherein upon a request of the driver for quick braking of the vehicle, the predetermined function is used causing quick reduction of the pressure $P_A$ introduced into the wheel brake due to the braking request of the vehicle speed control unit, and upon a request of the driver for slow braking of the vehicle, the predetermined function is used causing slow reduction of the pressure $P_A$ introduced into the wheel brake due to the braking request of the vehicle speed control unit.

6. Method as chimed in claim 2, the method further includes the steps of:

changing the predetermined function in accordance with the braking request of the driver, wherein upon a request of the driver for quick braking of the vehicle, the predetermined function is used causing quick reduction of the pressure $P_A$ introduced into the wheel brake due to the braking request of the vehicle speed control unit, and upon a request of the driver for slow braking of the vehicle, the predetermined function is used causing slow reduction of the pressure $P_A$ introduced into the wheel brake due to the braking request of the vehicle speed control unit, wherein a mean positive gradient $m_{PF}$ of the brake pressure is determined from the braking request of the driver, and therefrom the mean negative gradient $m_{PX}$ of the predetermined function is defined by the formula $$m_{PX}=-m_{PF}*\text{constant K},$$

until a top limit rate of 100 bar/sec is attained.

7. Method as claimed in claim 2, wherein a resulting brake pressure $P_{res}$ in the wheel brake of the vehicle is adjusted in accordance with the pressure $P_F$ introduced into the wheel brake due to the braking request of the driver and the pressure $P_X$ introduced into the wheel brake due to the predetermined function.

8. Method as claimed in claim 2, further including the step of:

adjusting a brake pressure $P_{res}$ in the wheel brake of the vehicle as a function of the sum of the pressure $P_F$ introduced into the wheel brake due to the braking request of the driver and the pressure $P_X$ introduced into the wheel brake due to the predetermined function.

9. Method as claimed in claim 2, further including the step of:

adjusting a resulting brake pressure $P_{res}$ in the wheel brake of the vehicle as a function of the greater of the pressure $P_F$ introduced into the wheel brake due to the braking request of the driver and the pressure $P_X$ introduced into the wheel brake due to the predetermined function.

10. Method as claimed in claim 2, further including the step of:

adjusting a resulting brake pressure $P_{res}$ in the wheel brake of the vehicle as a function of the pressure $P_F$ introduced into the wheel brake due to the braking request of the driver and the pressure $P_X$ introduced into the wheel brake due to the predetermined function, wherein a resulting brake pressure $P_{res}$ is adjusted in the wheel brake of the vehicle which corresponds to a value that is lower than a sum of the pressure $P_F$ introduced into the wheel brake due to the braking request of the driver and the pressure $P_X$ introduced by the predetermined function into the wheel brake, and which is higher than the higher one of the two pressures.

11. Method as claimed in claim 2, further including the step of:

adjusting a resulting brake pressure $P_{res}$ in the wheel brake of the vehicle as a function of the pressure $P_F$ introduced into the wheel brake due to the braking request of the driver and the pressure $P_X$ introduced into the wheel brake due to the predetermined function, and wherein the method further includes the step of:

adjusting a resulting brake pressure $P_{res}$ in the wheel brake of the vehicle as a function of a value that is lower than a sum of the pressure $P_F$ introduced into the wheel brake due to the braking request of the driver and the pressure $P_X$ introduced by the predetermined function into the wheel brake, and which is higher than the highest one of the two pressures, wherein a resulting brake pressure $P_{res}$ is adjusted in the wheel brake of the vehicle which corresponds to a value that is determined by the formula $$P_{res}=P_F+P_X-(P_F*P_X)/\text{constant Z}.$$

12. Method as claimed in claim 2, further including the step of:

adjusting a resulting brake pressure $P_{res}$ in the wheel brake of the vehicle as a function of the pressure $P_F$ introduced into the wheel brake due to the braking request of the driver and the pressure $P_X$ introduced into the wheel brake due to the predetermined function, and wherein the method further includes the step of:

adjusting a resulting brake pressure $P_{res}$ in the wheel brake of the vehicle which corresponds to a value that is lower than a sum of the pressure $P_F$ introduced into the wheel brake due to the braking request of the driver and the pressure $P_X$ introduced by the predetermined function into the wheel brake, and which is higher than the highest one of the two pressures, and the method further comprising a resulting brake pressure $P_{res}$ is adjusted in the wheel brake of the vehicle which corresponds to a value that is determined by the formula $$P_{res}=P_F+P_X-(P_F*P_X)/\text{constant Z},$$

wherein the constant Z has a value in the range of 20 bar to 100 bar.

13. Method as claimed in claim 2, wherein the brake pressure in the wheel brake is generated by independent energy.

14. Method as claimed in claim 2, further including the step of:

generating the brake pressure in the wheel brake by independent energy, wherein the brake pressure request of the driver is sensed by means of a pedal travel simulator and associated sensors and transmitted electronically to a brake control unit.

* * * * *

UNITED STATES PATENT AND TRADEMARK OFFICE
CERTIFICATE OF CORRECTION

PATENT NO. : 6,742,850 B1
DATED : June 1, 2004
INVENTOR(S) : Eckert et al.

It is certified that error appears in the above-identified patent and that said Letters Patent is hereby corrected as shown below:

Column 7,
Line 26, please change "Method as chimed" to -- Method as claimed --.

Signed and Sealed this

Fourteenth Day of December, 2004

JON W. DUDAS
*Director of the United States Patent and Trademark Office*